United States Patent
Fawaz et al.

(10) Patent No.: US 6,654,374 B1
(45) Date of Patent: Nov. 25, 2003

(54) METHOD AND APPARATUS TO REDUCE JITTER IN PACKET SWITCHED NETWORKS

(75) Inventors: Ayman Fawaz, Berkeley, CA (US); Jean Walrand, Berkeley, CA (US)

(73) Assignee: Extreme Networks, Santa Clara, CA (US)

(*) Notice: Subject to any disclaimer, the term of this patent is extended or adjusted under 35 U.S.C. 154(b) by 0 days.

(21) Appl. No.: 09/189,347

(22) Filed: Nov. 10, 1998

(51) Int. Cl.[7] .................................................. H04L 12/56
(52) U.S. Cl. .................... 370/394; 370/395.41; 370/412
(58) Field of Search ................................ 370/230, 231, 370/232–235, 253, 389, 395.21, 395.4, 395.41, 412–413

(56) References Cited

U.S. PATENT DOCUMENTS

| | | | |
|---|---|---|---|
| 5,313,454 A | 5/1994 | Bustini et al. ................ 370/13 |
| 5,359,592 A | 10/1994 | Corbalis et al. .............. 370/17 |
| 5,361,255 A | 11/1994 | Diaz et al. .................... 370/58 |
| 5,440,549 A | 8/1995 | Min et al. ..................... 370/60 |
| 5,485,455 A | 1/1996 | Dobbins et al. ............... 370/60 |
| 5,491,694 A | 2/1996 | Oliver et al. ................. 370/85.4 |
| 5,519,698 A | 5/1996 | Lyles et al. ................... 370/60 |
| 5,526,352 A | 6/1996 | Min et al. ..................... 370/60 |
| 5,623,668 A | * 4/1997 | Nieuwenhuizen ........... 395/670 |
| 5,675,576 A | 10/1997 | Kalampoukas et al. ...... 370/232 |
| 5,734,486 A | 3/1998 | Guillemot et al. ........... 359/139 |
| 5,742,772 A | 4/1998 | Sreenan ........................ 395/200 |
| 5,790,546 A | 8/1998 | Dobbins et al. .............. 370/400 |
| 5,812,545 A | 9/1998 | Liebowitz et al. ........... 370/337 |
| 5,926,459 A | * 7/1999 | Lyles et al. .................. 370/230 |
| 5,970,049 A | * 10/1999 | Borst et al. .................. 370/235 |
| 6,064,677 A | * 5/2000 | Kappler et al. .............. 370/414 |
| 6,101,193 A | * 8/2000 | Ohba ........................... 370/429 |
| 6,104,700 A | * 8/2000 | Haddock et al. ............. 370/235 |
| 6,304,574 B1 | * 10/2001 | Schoo et al. ................. 370/401 |

FOREIGN PATENT DOCUMENTS

| | | | |
|---|---|---|---|
| EP | 0 868 058 A1 | 9/1998 | ......... H04L/12/56 |
| WO | WO 94/14263 | 6/1994 | ......... H04L/12/56 |
| WO | WO 98/45976 | 10/1998 | |

OTHER PUBLICATIONS

Alon Itai and Zvi Rosberg, "A Golden Ratio Control Policy for a Multiple–Access Channel," Aug. 1984, pp. 712–718.

Cüneyt M. Özveren, "Reliable and Efficient Hop–by–Hop Flow Control," May 13, 1995, pp. 642–650.

* cited by examiner

Primary Examiner—Steven Nguyen
Assistant Examiner—Toan Nguyen
(74) Attorney, Agent, or Firm—Blakely Sokoloff Taylor & Zafman LLP (57) ABSTRACT

A packet-switched communication network in accordance with the invention provides a guaranteed minimum bandwidth between pairs of Packet Switches by defining Service Level Agreements (SLAs). An SLA is defined by at least a source identifier, a destination identifier, and a minimum data rate although other information can also be used. Upon arrival at certain networked nodes, packets are classified according to an SLA by reading the source and destination addresses in the packet. Once classified, the packets are placed in a queue and scheduled for transmission. A scheduler ensures that packets are transmitted at the minimum defined data rate for the SLA. The scheduler may use a statistical multiplexing method, such as deficit round robin, or deficit golden ratio, which is part of the present invention. The deficit golden ratio method assures a minimum rate to packets for a particular SLA, but minimizes jitter and delay. Further, the present invention implements congestion control that does not require nodes to be entirely turned off in congested conditions.

24 Claims, 10 Drawing Sheets

TIME- DIVISION MULTIPLEXING (TDM).
Fig. 1 (Prior Art)

STATISTICAL MULTILEXING - FIRST COME, FIRST SERVED.
Fig. 2 (Prior Art)

METHOD AND APPARATUS TO REDUCE JITTER IN PACKET SWITCHED NETWORKS

CROSS-REFERENCE TO RELATED APPLICATIONS

The present application is related to application Ser. No. 09/189,206, filed Nov. 10, 1998, entitled "Method and Apparatus for Interconnection of Packet Switches with Guaranteed Bandwidth," and to application Ser. No. 09/189,819, filed Nov. 10, 1998, entitled "Method and Apparatus to Minimize Congestion in a Packet Switched Network," both incorporated by reference herein.

FIELD OF THE INVENTION

The present invention relates to communication networks, and particularly, the present invention relates to providing guaranteed quality of service in a packet switched network.

BACKGROUND OF THE INVENTION

In communications technology, there is an ever-increasing demand for high-performance networks, and in particular, a demand for high-performance Internet access. This increased demand has led to the development of improved networks capable of handling larger volumes of data with smaller delays. Nonetheless, these improved networks each have their own shortcomings.

Communications networks like the Internet are generally formed with a number of transmission links interconnected with switches. A transmission link is any medium through which signals are communicated and can be single or multiple twisted pairs, optical fiber, coaxial cable, radio links, or other mediums. A switch is a device with one or more input ports and one or more output ports. The switch directs bits arriving at an input port to the appropriate output port. Switching in communications is accomplished using one of two methods: circuit switching and packet switching.

Circuit switching has been used since the birth of the modern telephone system. Circuit switching entails establishing an end-to-end connection between two points before any information is communicated. A telephone connection is one example of a circuit-switched connection. In early circuit-switched networks, information could only be communicated over the links if the links were not being used by another party and if an end-to-end connection was already established.

Figure 1:
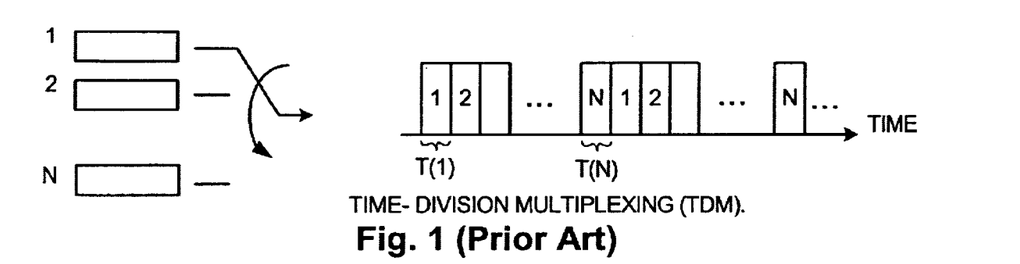
FIG. 1 is a representational block diagram illustrating time division multiplexing.

To make the circuit-switched network more economical, Time Division Multiplexing (TDM) was developed. TDM is a method that enables multiple end-to-end connections to share the same link. More specifically, using TDM the respective data streams are transmitted for a designated time period in a round robin fashion over a shared transmission link. For instance, referring to the illustration of FIG. 1, to multiplex N data streams using TDM, the first stream is transmitted for T(1) seconds, then the second stream for T(2) seconds, and so on until the N-th stream is transmitted for T(N) seconds. The cycle then repeats starting again with the first stream. Hence, each data stream gets a fraction of the total transmission rate for the shared link, i.e., the stream i (i=1, . . . , N) gets a fraction $$\frac{T(i)}{[T(1)+T(2)+\ldots+T(N)]}$$

of the transmission rate of the link. So, using TDM, a link with transmission rate R is capable of carrying data streams with rate R(1), . . . , R(N) provided that R(1)+ . . . +R(N) is less than R. Therefore, a circuit-switched network with TDM provides a guaranteed bandwidth to a connection from the source of the connection to its destination.

Despite the ability to send multiple data streams through a shared link at a guaranteed rate for each data stream, when a particular data stream does not need its time slot on the link, that fraction of the link capacity is wasted because other data streams are not permitted to use that time slot. Thus, although the circuit-switched network offers the user guaranteed bandwidth available at any time, when the user is not utilizing its allocated bandwidth, the link lays idle for the user's time slot—unavailable for use by any other party, leading to an inefficient utilization of available resources.

Even though there are inefficiencies inherent in circuit switching, such switching has proven satisfactory to carry voice data. Non-voice data, however, tends to be more "bursty" in nature. Hence, when a data burst arrives, having to wait through TDM cycles for transmission will make the transmission of data appear slow—an appearance that might be avoided if all resources were available for use.

To avoid the inefficiencies of circuit switching, the communications industry has made a shift to "packet switching" for non-voice type data transmission. Packet switching does not establish a single end-to-end connection for each data stream. Rather, the data stream is divided into "packets," each of which carries data as well as various identifying information about each packet. Such identifying information includes routing information, for instance, source and destination addresses for the packet. When a packet arrives at a switch, it is stored in a buffer. The switch looks at the routing information in the packet and routes the packet to the appropriate output port. The packets are then forwarded one "hop" (or switch) at a time, until they reach their destination. Each packet in a particular data stream does not necessarily follow the same path to its destination as the others.

In most networking protocols, the networking system is hierarchically divided into subnetworks that are interconnected. The nodes (e.g., personal computers) in each subnetwork are addressed by a "Layer 2" address (sometimes called a MAC address). A subnetwork delivers packets between any two of its nodes. These packets are labeled with the Layer 2 addresses of the source and destination nodes of the subnetwork.

Subnetworks can also be interconnected to one another with the use of specialized switches. These switches determine how to handle a packet based either on the Layer 2 addresses in the packet or on some other routing information. For instance, a switch interconnects a number of subnetworks through its several ports. For each of its ports, the switch maintains a list of Layer 2 addresses of the computers of the subnetwork(s) that is(are) attached to the port. When the switch receives a packet, the switch checks the port lists and identifies the port that is connected to the Layer 2 address for the destination of the packet. The switch then transmits the packet on that identified port. Other networking protocols additionally add special routing information in each packet. That routing information may be a connection number or a pair of geographically arranged addresses, as in the case of the Internet Protocol.

Figure 2:
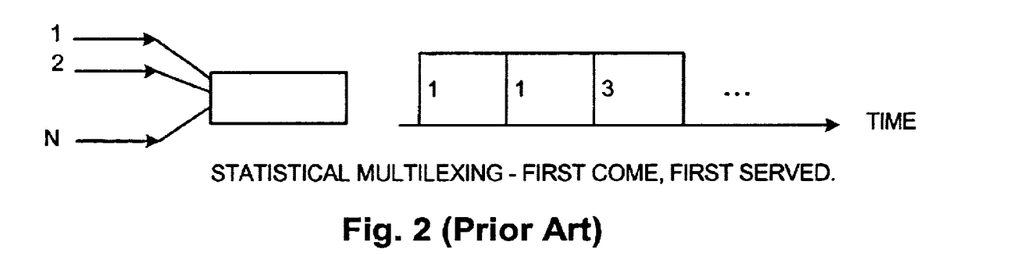
FIG. 2 is a representational block diagram illustrating first-come, first-served statistical multiplexing.

Since packets from different data streams are all routed over the same transmission lines, a scheduling method by which to place the packets from the different streams onto the transmission lines is required. One such scheduling method is statistical multiplexing (SM). In contrast with TDM, SM does not allocate fixed periodic fractions of the transmission rate of the link to the different data streams. Instead, the SM schedules packets for transmission depending on the actual needs of the different data streams. In its simplest form, illustrated in FIG. 2, statistical multiplexing schedules packets on the transmission line in the order of their arrival at the switch, i.e., on a first come, first served basis. Although such a scheduling method does not waste communication resources, it cannot guarantee a minimum transmission rate for any particular data stream. The packets simply get to their destination when they get there.

Figure 3:
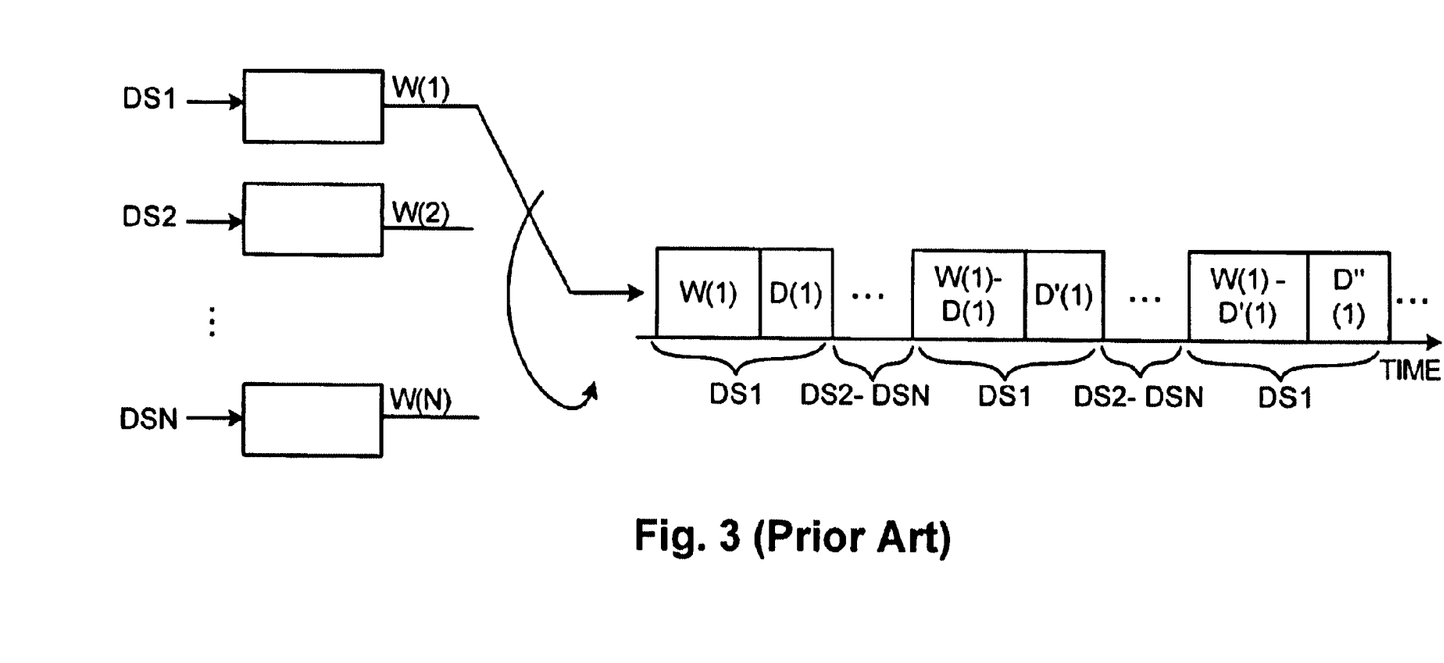
FIG. 3 is a representational block diagram illustrating deficit round robin scheduling.

A variation of SM called "deficit round robin" (DRR) can provide better transmission rate guarantees and is illustrated in FIG. 3. Under DRR, to multiplex N data streams, N integers W(1), ... W(N), are first chosen as a weight (W) for each data stream. Then for the first data stream (DS1) up to W(1) bits are transmitted. If all of the packets of DS1 are transmitted before transmitting W(1) bits or if bit W(1) is the last bit of a packet, then a second integer D(1) is set to 0. But if bit W(1) is not the last bit of a packet, then additional bits are sent until the transmission of the packet is completed, and D(1) is set to equal the number of additional bits sent. The procedure is repeated for data streams DS2, ..., DSN with the corresponding numbers W(2), D(2), ... W(N), D(N). The cycle then repeats starting with DS1, but W(1) is replaced with W(1)–D(1). Hence, W(1)–D(1) bits are transmitted instead of W(1) (in other words, D(1) represents a "deficit" of DS1). If there are additional bits remaining in a packet, then those D'(1) additional bits are sent. The procedure is again repeated for DS2, ..., DSN in a similar manner. When the procedure returns again to DS1, W(1)–D'(1) will replace W(1).

Therefore, using DRR, a minimum transmission rate for a data stream DSi (where i=1, ..., N) will generally be the fraction $$\frac{W(i)}{[W(1) + W(2) + \ldots + W(N)]}$$

of the transmission rate for the link. Moreover, if some data streams do not need their guaranteed allocation, then the other connections can utilize the unused resources and will do so automatically. Many variations of DRR are known in the art, including Weighted Fair Queuing (WFQ), Generalized Processor Sharing (GPS), and Class Based Queuing (CBQ).

Despite DRR's ability to generally provide some minimum transmission rate, the capacity for the transmission of data at a particular rate is still not reserved like it is in circuit-switched networks. Hence, there is still the possibility that delivery of a message will be delayed. Therefore, most data communication service providers, although they utilize statistical multiplexing for packet transmission, will not guarantee any minimum quality of service. "Quality of service" refers herein to a minimum bandwidth provided between two points, A and B.

The advent of Asynchronous Transfer Mode (ATM) seems to combine the benefits of statistical multiplexing with the guaranteed quality of service of circuit switching. While ATM sends data in packets, or cells, ATM sets up a "virtual channel" before transmitting any data. All of the frames follow the same route along the virtual channel, thereby guaranteeing the order of cell arrival. Further, because data is sent in cells, these cells can be statistically multiplexed, and can use all available resources efficiently while guaranteeing a minimum quality of service. To allow all incoming data streams access to a shared link, ATM monitors the number of packets or cells received from a particular data stream. If the number received during a time interval exceeds a threshold designated for the incoming data stream, then packets/cells are discarded.

Nonetheless, ATM is a complicated protocol and expensive to implement, requiring complex hardware and network management software. Further, in addition to setting up and maintaining virtual channels, ATM requires the reformatting of received data packets into special ATM cells that include a virtual channel identifier and a virtual path identifier unique to ATM. So while ATM has been used by telephone service providers, because of its expense and complexity it is not generally used for Internet or other data communications.

Therefore, a simplified system and method for providing a guaranteed quality of service for Internet and other packet-switched data communications is desirable.

SUMMARY OF THE INVENTION

In order to overcome the deficiencies in communication networks described above, a system and method in accordance with the invention provides a simple, yet flexible packet-switching system that can guarantee quality of service between two points. In particular, such a system includes a plurality of linked nodes. Packet Switches, such as standard routers, are coupled to the nodes.

Service Level Agreements, or SLA's, are defined between pairs of Packet Switches and guarantee a minimum quality-of-service (minimum bandwidth) between the two packet switches. When a packet arrives at a node from a packet switch, the node inspects certain classification information contained within the packet. In one embodiment, such classification information is the source and destination identifiers (e.g., addresses) of the packet, while in other embodiments classification information additionally includes other information. Using the classification information, the packet classifies the packet with an SLA. A scheduler in the node ensures that packets from each SLA are scheduled for transmission at at least the minimum data rate corresponding to the SLA.

In one embodiment, each SLA has its own queue in the node. In such an embodiment, a scheduler schedules the packets for transmission using a statistical multiplexing method. In one embodiment, such a method is a DRR method. In another embodiment, such a method is a modified DRR method referred to herein as a "Deficit Golden Ratio" (DGR) method. A DGR method in accordance with the invention, redistributes the order of the packets that would otherwise be output using a DRR method, thereby eliminating jitter and delay often caused by DRR scheduling.

In a second embodiment, the SLA's served by a node share a queue. In other words, all packets, no matter which SLA they are classified with, are placed in the same queue. However, a statistical multiplexing scheduling method referred to herein as SLA Early Discard is utilized to ensure the minimum bandwidth of all SLAs. If the number of packets in the queue for a particular SLA have reached or exceeded a threshold value, then no additional packets for that particular SLA are added to the queue. Any newly arriving packets for the SLA are discarded. If the packets for the particular SLA have not reached the threshold, then additional packets for that SLA can be added to the queue.

In addition to classification and scheduling, nodes in accordance with the invention further implement congestion control. When packets for a particular SLA are transmitted at a rate higher than the minimum rate designated for the particular SLA, then downstream nodes receiving those packets may become congested. In one embodiment, those downstream nodes provide messages to the upstream nodes indicating that the rate of transmission for packets from the particular SLA should be reduced. In some embodiments, the node may turn off service for the particular SLA while it is congested. However, service to the other SLA's remains turned on in the node.

Thus, a system and method in accordance with the invention can provide service to users akin to leased lines in a circuit switched system, although the system and method described herein is for packet switching. Moreover, such service can be provided without reformatting data packets as is done in ATM. In one embodiment, the nodes in accordance with the invention have ethernet interfaces and accept and forward ethernet packets without change. Hence, standard packet switches "see" a network in accordance with the invention as an ethernet-type network. Finally, such guaranteed quality-of-service can be provided with minimal additional hardware and software unlike other conventional networking methods such as ATM.

BRIEF DESCRIPTION OF THE DRAWINGS

The present invention is described with respect to particular exemplary embodiments thereof, and reference will be made to the drawings, which are not necessarily drawn to scale and in which:

FIGS. 13($a$) and 13($b$) are functional block diagrams representing reconfiguration of a ring in accordance with the invention.

DETAILED DESCRIPTION

A system and method in accordance with the invention provides a simplified method of packet-switched data communications with a guaranteed minimum bandwidth between any two given points. Although a system and method in accordance with the invention is packet-switched, it can provide service much a like a leased line in circuit-switched networks. Still, a system in accordance with the invention is not inefficient with its resources as circuit-switched networks are.

In order to provide a guaranteed bandwidth on a packet-switched data communication system, a system and method in accordance with invention utilizes two elements: (1) packet classification and (2) packet scheduling. In some embodiments an additional third element, (3) distributed back pressure, is also utilized. Each of these elements will be described below. But first, a general overview of the network to be used in accordance with the invention is given.

Figure 4:
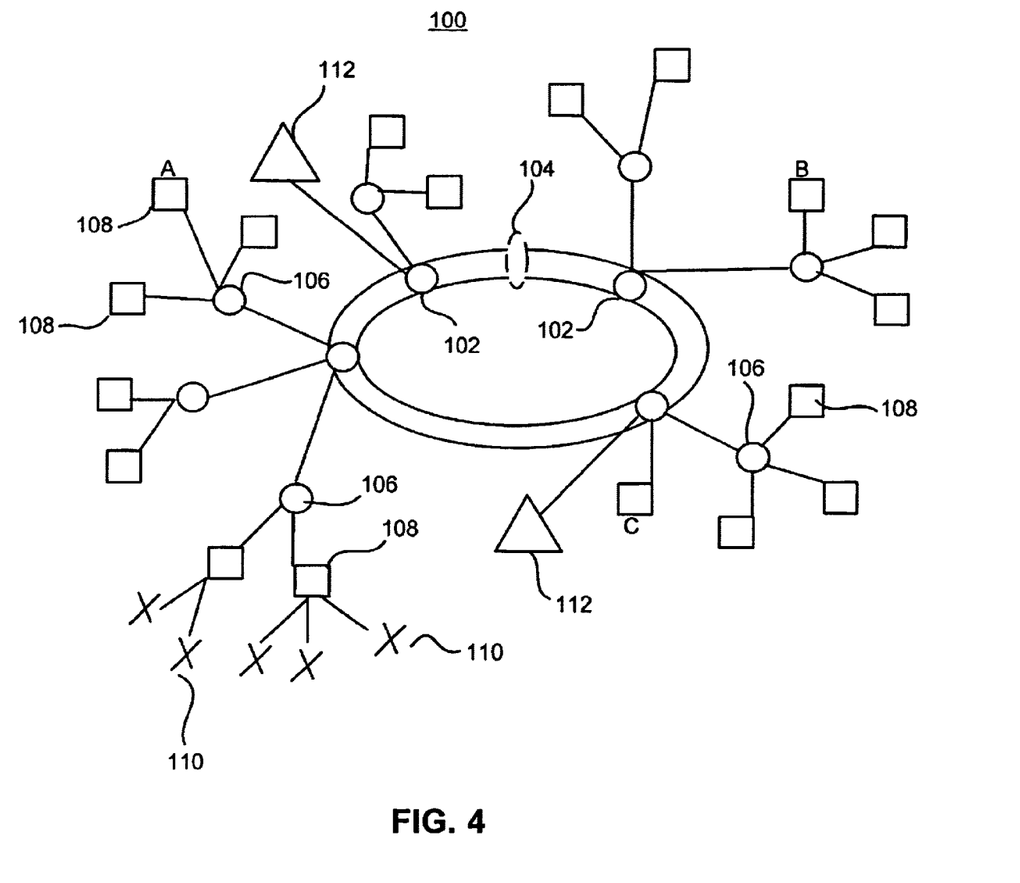
FIG. 4 is a functional block diagram representing a network in accordance with the invention.

FIG. 4 shows a generalized functional block diagram of a network 100, incorporating an embodiment of the invention. As shown in FIG. 4, network 100 includes a number of nodes 102, which are interconnected to form a ring 104. The nodes 102 on the ring 104 are sometimes referred to herein as "ring nodes." In one embodiment, ring 104 is formed with dual rings, which will be described in more detail later. Coupled to many of the ring nodes 102 are other nodes 106, sometimes referred to herein as "multiplexing nodes." Other than their location on or off of ring 104, ring nodes 102 and multiplexing nodes 104 are substantially the same. In FIG. 4, both types of nodes are denoted by a circle, "○", and are generically referred to herein as "Quality of Service Nodes" or "QoS Nodes."

In one embodiment, the QoS Nodes 102, 106 include ethernet interfaces that operate at 1 Gbps. In other embodiments, however, the nodes may operate at a different rate (e.g., 10 Mbps, 100 Mbps, OC12, OC48, OC96, OC192). Moreover, some QoS Nodes may operate at one rate while other QoS Nodes operate at a second rate. Hence, the actual rates for either of the types of QoS Nodes are not intended to be restricted by the invention nor are the interfaces utilized.

Further, the actual links between the QoS Nodes can be formed in any manner known to those of skill in the art. For instance, the links interconnecting the QoS Nodes can be built from single or multiple twisted wire pairs, optical fibers, or coaxial cable. In other embodiments, the links can be radio links, or even free space infrared links. In addition the protocol used by the links may be based on Gigabit Ethernet, ATM, WDM, SONET, or other technology.

FIG. 4 further illustrates the plurality of packet switches 108, denoted with a square symbol, "□". The packet switches are similar to those known by persons of ordinary skill in the art. For instance, packet switches can be routers with standard ethernet interfaces such as those made by Cisco Systems or Nortel Networks. The packet switches are attached either directly to ring 104 via a ring node 102, or indirectly to the ring 104 via a multiplexing node 106. Each packet switch 108 is in turn coupled to a number of LANs or other subnets 110, denoted by an "X" indicator (only a few subnets are illustrated).

As used herein, "packet switches" 108 denote standard packet switches, which are known in the art and include devices such as routers. Ring nodes 102 and multiplexing nodes 106, although technically packet switches (since they route incoming packets to output ports), are distinguishable from standard packet switches, and are referred to herein as "Quality of Service Nodes" or "QoS Nodes."

Packet Classification and Scheduling

In accordance with the invention, a minimum quality of service (a minimum bandwidth) is provided between selected pairs of packet switches, such as from A to B, B to A, or from A to C. The quality of service for a particular packet switch pair is referred to herein as a Service Level Agreement, or SLA. Each SLA includes at least three elements: a source packet switch, a destination packet switch, and a minimum data rate for data transfers between the two packet switches. For instance, referring again to FIG. 4, an SLA may be, for example, a 128-kbps connection between A and B.

Figure 5:
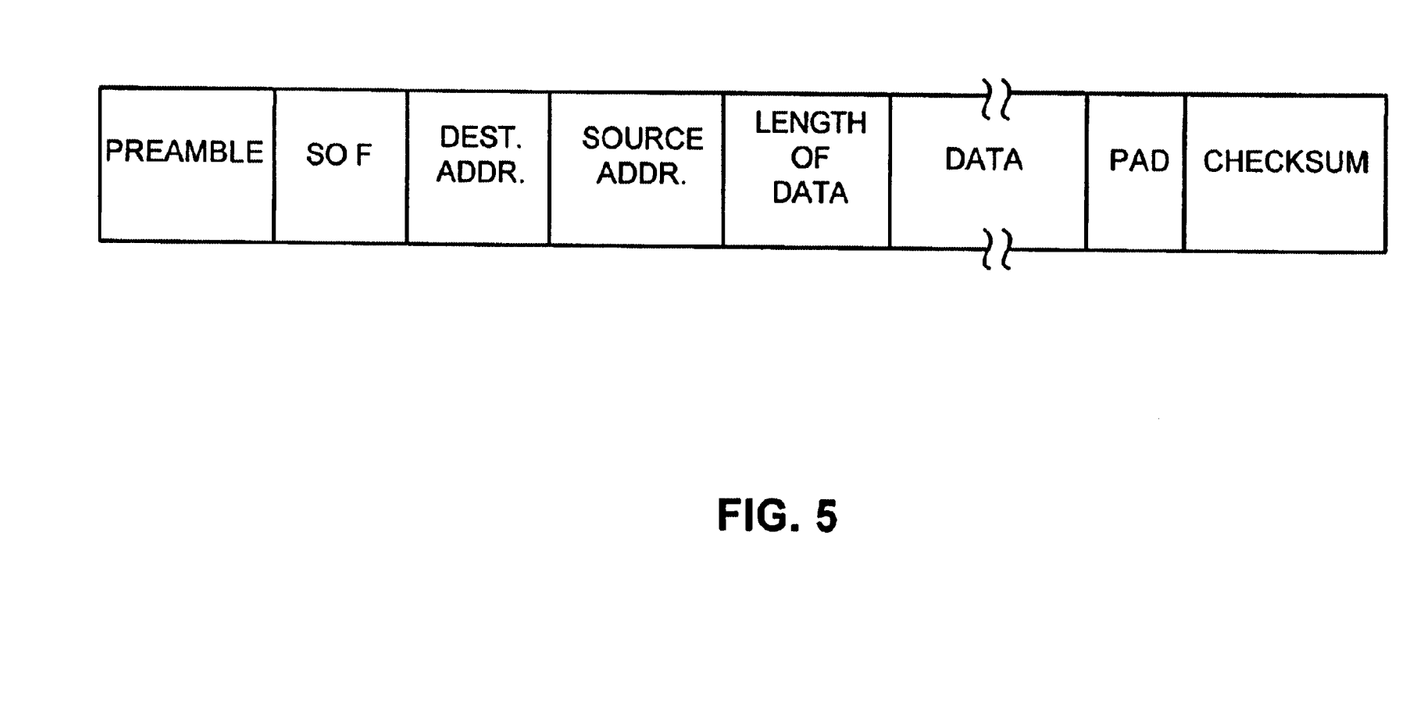
FIG. 5 is a block diagram illustration of an ethernet frame.

In one embodiment of the invention, the packets received at each QoS Node 102, 106 from a packet switch 108 are ethernet frames, which specify the Layer 2 address of the source packet switch and the Layer 2 address of the destination packet switch. A standard ethernet frame is shown in FIG. 5. A frame includes a preamble field, a start-of-frame (SOF) field, a destination address field, a source address field, a length of data field, a data field, a pad field, and a checksum field. These as well as the other fields are well documented and known in the art, however, the destination and source address fields are of more importance with respect to the present invention. Thus, in one embodiment of the invention, the QoS Nodes operate at Layer 2 with ethernet frames.

Although ethernet frames (packets) are frequently referred to herein, other types of packets could be utilized in other embodiments of the invention. Hence, ethernet packets are used for purposes of illustration only, and such illustration is not intended to limit the scope of the invention.

FIRST EMBODIMENT

Figure 6:
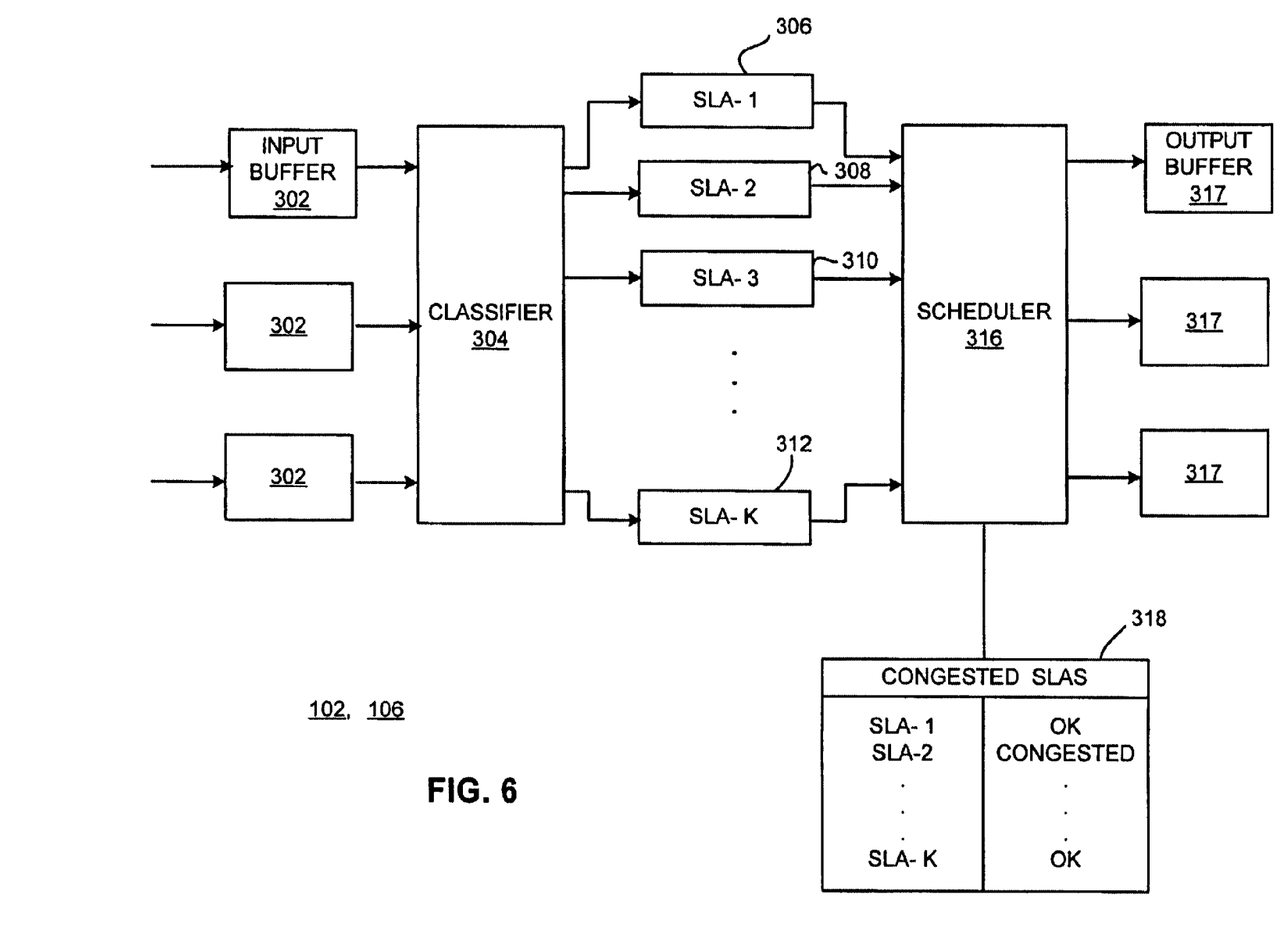
FIG. 6 is a functional block diagram of a node in accordance with the invention.

A first embodiment of a node 102, 106 is shown in FIG. 6. Upon arrival at a QoS Node 102, 106, packets (e.g., ethernet frames) are placed into an input buffer 302. Subsequently, classifier 304 classifies each packet in accordance with an SLA. To do so, classifier 304 reads at least the source and destination identifier of the packet to be classified, for instance, Layer 2 ethernet frame addresses. The classifier 304 then correlates the pair of identifiers with a corresponding SLA. In one embodiment, such source and destination identifiers are physical addresses, while in other embodiments such source and destination addresses may be composed of other information.

In addition to source and destination identifiers, other embodiments of the invention may utilize other information for packet classification. For instance, the type of application (e.g., e-mail) from which the packet originated can additionally be used to classify packets with an SLA. Thus, the information used for classifying packets is referred to herein as "classification information."

In one embodiment of the invention, once an SLA has been identified for the packet using the various classification information, the packet is placed into a FIFO-type buffer 306–312 that corresponds to the SLA, forming a queue of packets for the SLA. Unlike ATM and other protocols, the packets do not need to be reformatted or modified in any way.

Once the packets have been classified according to their SLA, the packets are scheduled for transmission by scheduler 316 and placed in an appropriate output port 317. For purposes of continued discussion, the scheduling methods used herein are discussed with reference only to a single output port, although it is to be understood that a QoS Node could have more than one output port.

In order to guarantee quality of service for each SLA, a scheduler in one embodiment of the invention uses the Deficit Round Robin (DRR) scheduling method described previously with respect to FIG. 3. With DRR, the bandwidth for the particular data stream is greater than or equal to the rate (R) of the link times the weight (W) for a particular data stream divided by the sum of weights. In other words, $$\frac{RW(i)}{W(1)+W(2)+\ldots+W(N)} \leq bandwidth.$$

Therefore, using the DRR scheduling method, a minimum quality of service for each SLA can be guaranteed.

Nonetheless, DRR may introduce delay and/or jitter into the bit stream, particularly when there are many queues. In other words, during the time that bits for SLA-1 are being sent, bits from the other SLA's must wait. Likewise, once SLA-1's turn has passed, no bits will be sent from SLA-1 until bits from all of the other participating SLA's have been sent. Such wait times may be unacceptable for some applications.

Therefore, in accordance with one embodiment of the invention, a new scheduling method is utilized, referred to herein as the Deficit Golden Ratio (DGR) method. To reduce jitter, DGR schedules the bits in a similar manner to that done for DRR, but rather than imposing wait times, the DGR method interleaves bits from each of the SLA queues. The distribution is performed utilizing the Golden Ratio:

$$\frac{\sqrt{5}-1}{2} \cong 0.62.$$

More specifically, much as with DRR, the order of transmission for DGR is constructed utilizing the weights W(k) (in bits) assigned to each SLA-k, k=1, ..., K. An integer P(k) is then set to equal the integer part of W(k)/1000. Since the average packet length in Internet Protocol (IP) applications is about 1000 bits, P(k) is approximately the average number of packets of SLA-k that DRR would serve in one cycle. In other embodiments, P(k) can be found using a denominator other than 1000, for instance, if an average packet length is a different value.

The DGR scheduler constructs a packet sequence {packet-1, ..., packet-P} for transmission, where P=P(1)+...+P(K). The packet sequence is chosen so that there are P(k) packets from SLA-k in the sequence. The sequence is selected so that the packets from each SLA are distributed in the sequence. The sequence is constructed as follows.

First, the successive decimal parts of the first P multiples of 0.62 (the golden ratio) are calculated by the scheduler. By way of example, if P(1)=3, P(2)=1, P(3)=2, then P=6, and the decimal parts of the first six multiples of 0.62 are set forth in Table 1 below:

TABLE 1

| Multiple | Decimal Part |
| --- | --- |
| 0 | 0.00 |
| 1 | 0.62 |
| 2 | 0.24 |
| 3 | 0.86 |
| 4 | 0.48 |
| 5 | 0.10 |

The scheduler sequentially groups these multiples into groups corresponding to each SLA-k, where each group has P(k) sequential multiples. Continuing the above example, since P(1)=3, then SLA-1 is designated the first three multiples, SLA-2 will receive the next one multiple since P(2)=1, and since P(3)=2, SLA-3 receives the last two multiples. The designated decimal parts of the multiples are shown in Table 2 below:

TABLE 2

| SLA | Designated Decimal Parts of N multiples of 0.62 |
| --- | --- |
| SLA-1 | 0, 0.62, 0.24 |
| SLA-2 | 0.86 |
| SLA-3 | 0.48, 0.10 |

To determine the packet sequence, the decimal parts are placed by the scheduler in increasing order, where the designated SLA-k remains correlated to the decimal part. For the example above, such ordering is shown in Table 3:

TABLE 3

| Decimal Part | SLA |
| --- | --- |
| 0.00 | SLA-1 |
| 0.10 | SLA-3 |
| 0.24 | SLA-1 |
| 0.48 | SLA-3 |
| 0.62 | SLA-1 |
| 0.86 | SLA-2 |

The scheduler will output packets from the SLAs according to the re-ordered decimal parts. Hence, Table 3 indicates that the packet sequence output by the scheduler in our example should be from {1, 3, 1, 3, 1, 2}, where the numbers inside the brackets correspond to SLA numbers.

Figure 7:
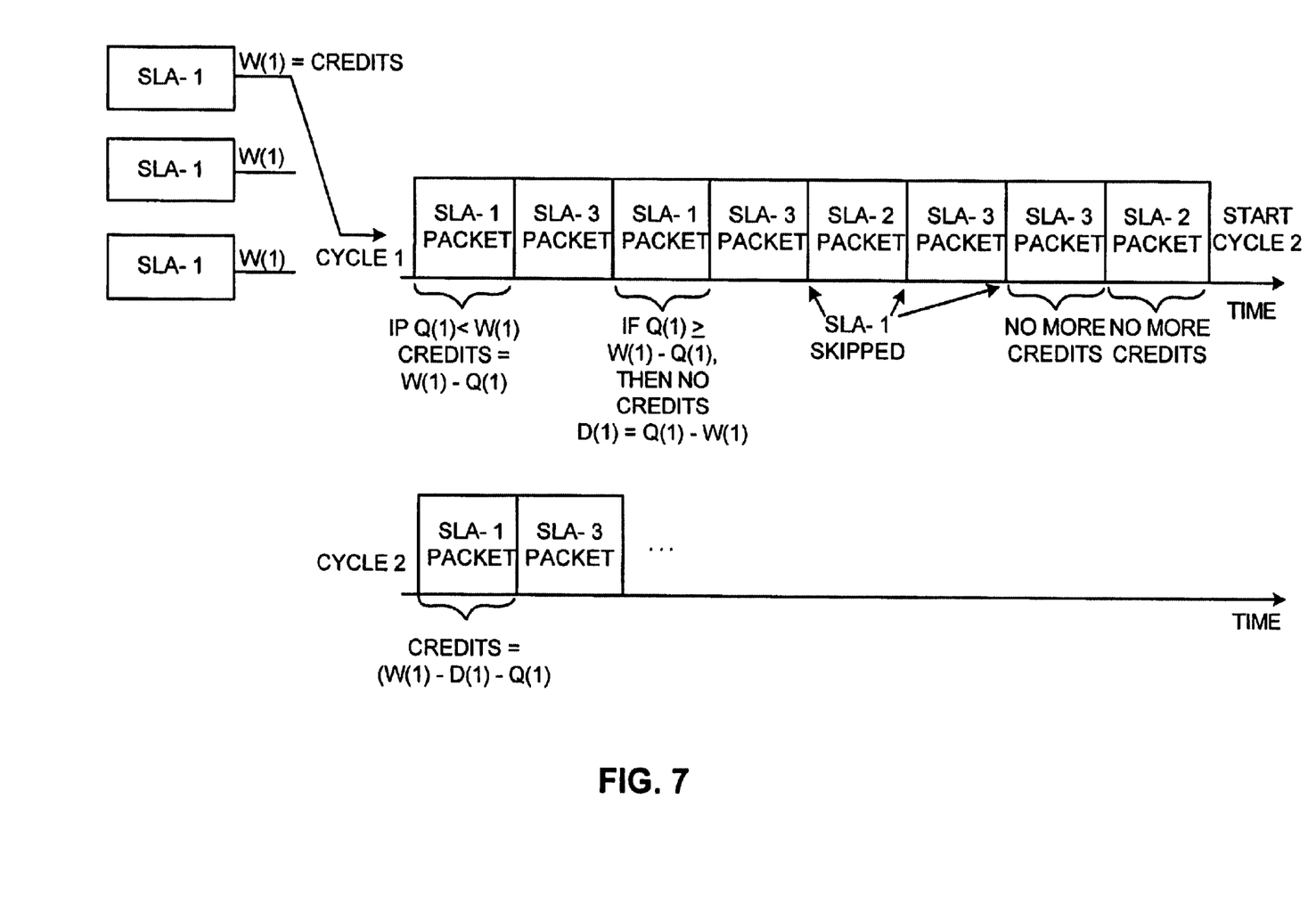
FIG. 7 is a representational block diagram illustrating deficit golden ratio scheduling in accordance with the invention.

Using the sequence above, the DGR scheduler transmits bits from the SLA sequence in a manner similar to DRR. Specifically, the scheduler utilizing a DGR method in accordance with the invention first transmits one packet from the first SLA in the sequence, in the above example, SLA-1 (see Table 3), where this packet has Q(1) bits. If Q(1) is greater than or equal to W(1), then the scheduler sets D(1)=Q(1)−W(1). SLA-1 is then dropped form the rest of the current scheduling cycle (i.e., in the example above, the second and third occurrences of SLA-1 in the Table 3 sequence would be skipped). Otherwise, the scheduler notes that SLA-1 still has W(1)−Q(1) credits. The scheduler then continues this procedure with the other SLAs in the DGR sequence, e.g., in Table 3 above, SLA-3, then SLA-1, and so on, sending a packet from each SLA unless the SLA has been dropped from the cycle. After it has reached the last SLA in the sequence, the scheduler starts again from the beginning of the sequence and continues to perform the same procedure until all of the SLAs have exhausted all of their credits (i.e., until all SLA's have been dropped from the cycle). At this point, the cycle ends, and the scheduler starts a new cycle with the credits W(i) replaced by W(i)−D(i). Upon exhaustion of all credits by the SLAs, another new cycle starts where the credits allocated to each SLA are W(i)−D'(i), and so on. An example output stream is shown in FIG. 7.

In this manner, the DGR scheduling method results in smoother traffic and smaller delays, but still guarantees the bandwidth reserved for the SLA.

It should be understood by those of skill in the art that the classifier and scheduler described above can be implemented in hardware, software, and/or firmware, or any combination thereof.

SECOND EMBODIMENT

Figure 8:
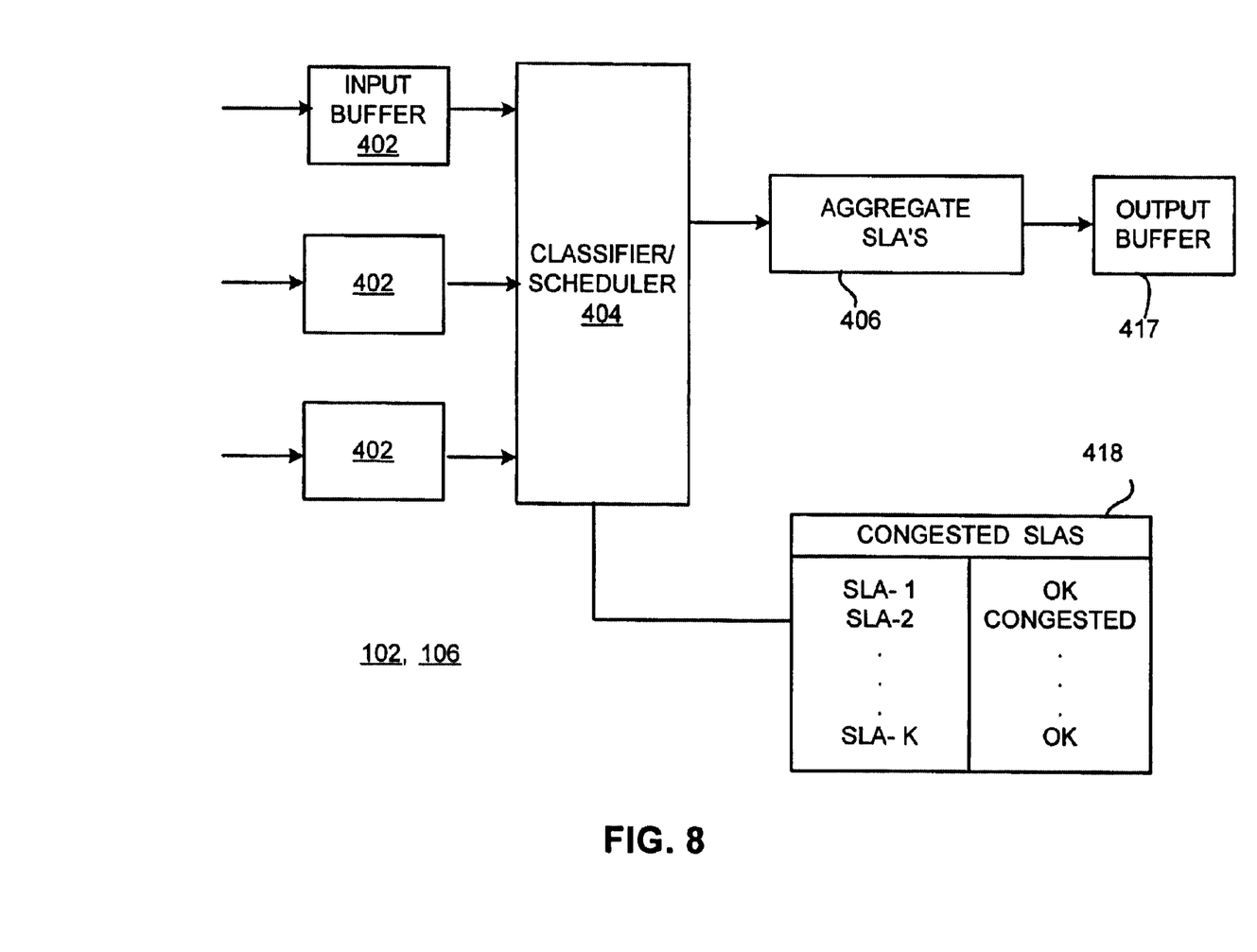
FIG. 8 is a functional block diagram of a second embodiment of a QoS node in accordance with the invention.

A second embodiment of a QoS Node 102, 106 is shown in FIG. 8. Rather than having a single queue per SLA, as in FIG. 6, only one queue, an "aggregate queue," is used for all SLA's in FIG. 8. When packets arrive at a QoS Node from various packet switches, the packets are buffered in input buffers 402. The classifier 404 maintains a single first-in, first-out queue in buffer 406 for all the SLA's. The packets are placed in the buffer 406 in the order of their arrival at the QoS Node. The packets, however, are only placed by classifier 404 into the queue if a scheduler allows such placement. Such a scheduler operates in accordance with a scheduling method referred to herein as "SLA Early Discard," and represents a new form of statistical multiplexing.

Figure 9:
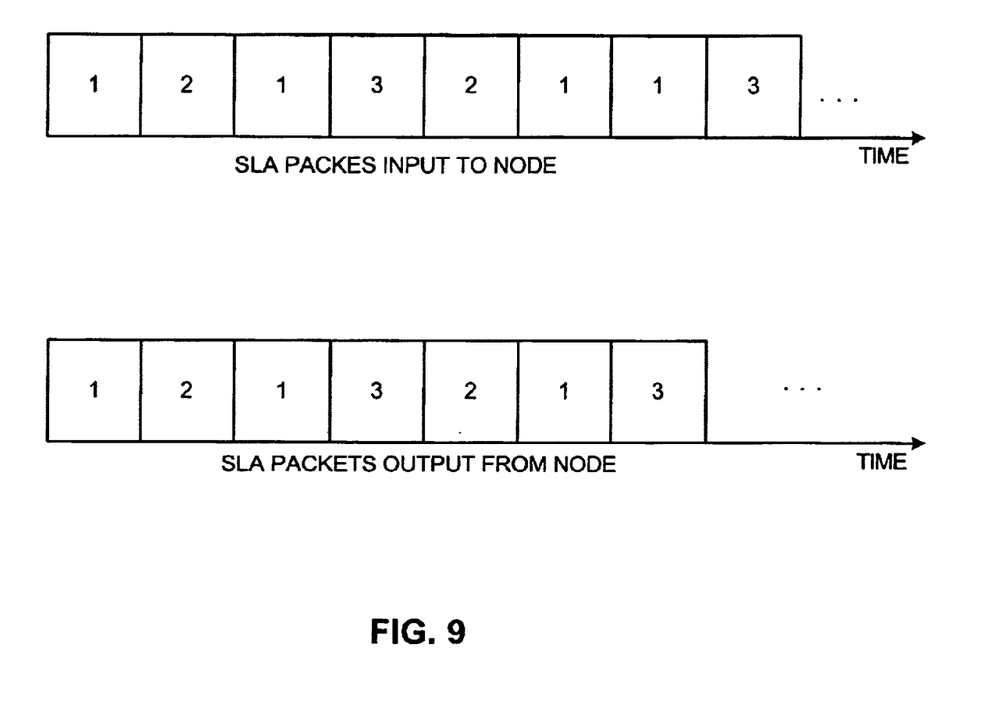
FIG. 9 is a representational block diagram of packets input into a QoS node and packets output from the node using SLA early discard in accordance with the invention.

In accordance with SLA Early Discard, each SLA-k (where k=1, . . . , K) is assigned some integer weight, M(k). When a packet of SLA-k arrives at the QoS Node 102, 106, the packet is accepted into the queue only if the number of packets for that particular SLA in the queue is less than M(k). If the number of packets in the queue for the particular SLA have reached or exceeded M(k), then the packet is discarded. For example, if there are three SLA's, if M(1)=3, M(2)=2, and M(3)=2, and if packets arrive at the node in the following order {1, 2, 1, 3, 2, 1, 1, 3}, then the fourth packet from SLA-1 is discarded. Discarded packets can be resent from the source or otherwise later recovered in a manner known to those of skill in the art. The resulting packet stream is shown in FIG. 9. In other embodiments, the number of bits in the aggregate queue for a particular SLA are monitored instead of the number of packets.

Consequently, if all SLA's are busy, then the packet queue contains about M(1)+M(2)+ . . . +M(k) packets. The link transmits a fraction $$\frac{M(k)}{M(1) + M(2) + \ldots + M(N)}$$

of its packets from SLA-k. Therefore, SLA-k is guaranteed the fraction listed above of the total link bandwidth. Further, packets are only discarded after monitoring the aggregate queue, whereas in ATM, packets are discarded solely on the basis of the source they are form. In ATM, regardless of whether other resources are required by other data streams, packets are discarded upon reaching a threshold for that source during a given time interval. In contrast, the SLA early discard method of the present invention only discards packets if they exceed a percentage of the aggregate queue.

For example, if the total memory (i.e., the number of bits the aggregate queue can store) for a 1 Gbps link is 2 MB, the delay of the QoS Node (the time the packet arrives to the time the packet is transmitted) is approximately 16 ms for each packet. If 2 MB correspond to approximately 16,000 packets with an average length of 1000 bits per packet, two packets should be allocated for M(k) for 128-kbps agreement. That is, if SLA-k has a rate equal to n×128 kbps, M(k)=2n if the port rate is 1 Gbps. If the port rate is R Gbps then, M(k)=2nR. For SLA's that have a rate equal to large multiples of 128 kbps, the fluctuations in packet sizes should not significantly affect the actual guaranteed minimum bandwidth.

It should again be understood by those of skill in the art that the classifier and scheduler for a node described above can be implemented in hardware, software, and/or firmware, or any combination thereof.

In essence, using either embodiment as described above, the SLA's can be equated to virtual leased lines. In other words, although operating in a packet-switched network, minimum bandwidth can be guaranteed between pairs of packet switches. Moreover, such guarantees are provided while still utilizing standard packet switches and without modifying router software. In fact, one embodiment of the invention is compatible with packet switches that include standard Ethernet interfaces. Yet, the frame structure for Ethernet (or other) packets does not need to be modified as they would for SONET and ATM, causing the system to appear to the packet switch as a shared Ethernet. Nor does a system in accordance with the invention require complex hardware and software akin to that required for ATM.

Congestion Control

As described above, each node will transmit packets for each SLA at a minimum rate. Nonetheless, the actual rate provided can actually be faster than the minimum guaranteed rate. But if such faster service is provided, the capacity of some links in the network may be exceeded.

Therefore, in addition to the classification and scheduling methods described above, in some embodiments the QoS Nodes may additionally implement a congestion control method herein referred to as Distributed Back Pressure (DBP). To avoid link overflow problems, each QoS Node monitors whether any of its SLA's are congested and maintains a list of all congested SLA's. Such a list is represented in FIG. 6 at 318 and in FIG. 8 at 418. The status of an SLA is marked as "congested" when the occupancy of the queue corresponding to that SLA exceeds some threshold H. The status is reset to "non-congested" when the occupancy of the queue corresponding to the SLA falls below the threshold H. Periodically, the QoS Node sends a control message to its neighboring QoS Nodes, including a current list of all congested SLA's. Each QoS Node uses these control messages to maintain and update its own list of the congested SLA's. The scheduler (316 in FIG. 6) for each QoS Node then skips (does not schedule any packets from) every SLA queue marked as congested. Alternatively, the QoS Node can simply reduce the rate of transmission for the SLA, e.g., to the minimum guaranteed rates.

Figure 10:
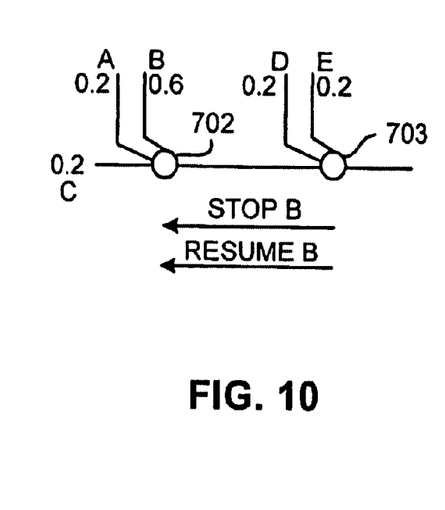
FIGS. 10, 11, and 12 illustrate, in block diagram format, congestion control in accordance with the invention.

FIG. 10 shows three streams A, B, C transmitting with rates 0.2, 0.6, and 0.2, respectively, and that share an output port of the first QoS Node 702 that has an output port rate 1. The SLAs for A, B, and C have minimum rates of 0.2 each. However, the scheduler lets stream B be overactive. As a result, the queue for SLA-B in the second QoS Node 703 gets saturated: the five SLAs in node 703 each get a service rate of 0.2 but the input of the queue for the SLA-B in the second QoS Node 703 has rate 0.6. The second QoS Node 703 sends a message to QoS Node 702 indicating that QoS Node 702 should stop transmitting packets from SLA-B or reduce the transmission rate to the minimum guaranteed rate, e.g., 0.6. Hence, backpressure is asserted at the source of SLA-B. Only those SLA queues that are congested are switched off or rate reduced—not the entire QoS Node. In other words, the SLAs for A and C will continue to transmit. In contrast, conventional network flow control techniques actually stops the entire flow from a switch when congestion is detected.

If using an embodiment of the invention such as that as shown in FIG. 8, where both the upstream and downstream nodes use aggregated queues, DBP can still be utilized. Like the embodiment of FIG. 6, the embodiment of a QoS Node in FIG. 8 provides at least a minimum bandwidth for each SLA. Still, the bandwidth provided is permitted to exceed the minimum, which could cause congestion in the input queues of other QoS Nodes. When congestion does occur on a QoS Node, the congested QoS Node sends a STOP message to the upstream QoS Node indicating that the upstream QoS Node should stop transmitting. After some time, the queue at the congested QoS Node empties and the now uncongested QoS Node informs the source QoS Node to start transmitting again. Alternatively, in another embodiment, rather than sending a STOP signal, the congested QoS Node can inform the source QoS Node to serve the aggregate SLA's at a lower rate, e.g. at the minimum guaranteed rate.

Figure 11:
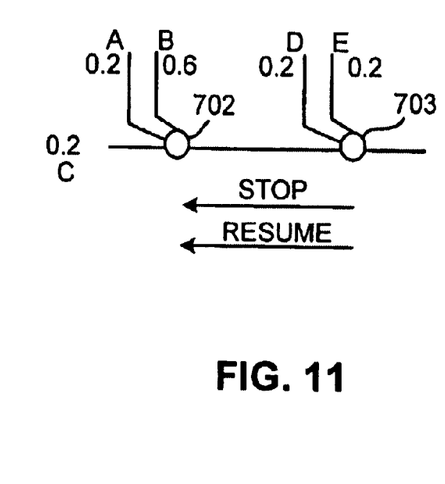
Figure 12:
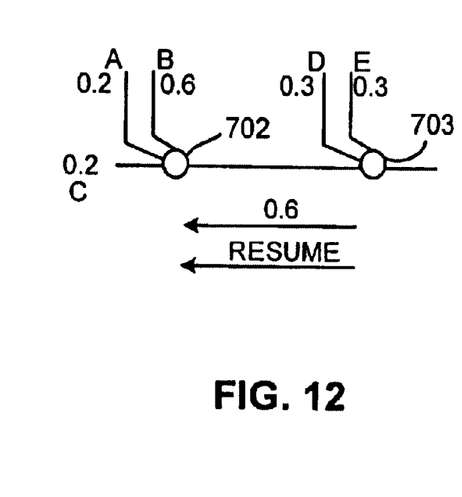

For example, FIG. 11 shows DBP when the data streams A, B, and C share a single queue in QoS Node 703. As in FIG. 10, the SLA's for A, B, and C have minimum rates of 0.2, although the scheduler in QoS Node 702 has allowed SLA-B to transmit at 0.6. QoS Node 703 sends a STOP message to node 702, turning off all the streams from A, B, and C. Eventually, QoS Node 703 indicates that the streams can resume. As a result, A, B, C together get a service rate in QoS Node 702 equal to 0.6. This total rate is divided equally between A, B, and C which then get 0.2 each. Alternatively, in FIG. 12, when the SLAs A, B, and C share a queue in QoS Node 703, QoS Node 703 sends a message to QoS Node 702 to serve at its guaranteed minimum aggregate rate (0.6) instead of turning off.

In addition, each QoS Node in some embodiments of the invention, can also implement an internal flow control. When the occupancy of an output buffer 317 (FIG. 6) exceeds a high threshold, the scheduler 316 marks the SLA's that should be sent to that buffer as congested and skips those queues. When the occupancy of a queue in an SLA buffer 306–312 reaches a maximum value, the QoS Node stops transferring packets from the input buffers 302 to the SLA queue. When an input buffer 302 gets full, the ethernet interface sends a signal to appropriate packet switches to stop sending packets.

The overall effect of this flow control both external and internal to the node is to distribute the cumulative packets from an overactive SLA inside the SLA queues of the QoS Nodes while keeping the other SLA's flowing, until the packet switch itself gets stopped. Accordingly, DBP in accordance with the invention exercises a finer congestion control than conventional flow control that shuts off a link completely instead of stopping only the overly active data streams.

Network Bandwidth Management

In order to manage the bandwidth for the various SLA's, a pair of bandwidth managers 112 are included in the network as shown in FIG. 4 with a "$\Delta$" symbol. The bandwidth managers determine if a new SLA can be accepted. For reliability in one embodiment, two bandwidth managers 112 are provided attached to the ring at different ring nodes 102. The bandwidth managers 112 monitor the current ring configuration and network topology and keep track of the bandwidth reserved between any two pairs of packet switches. Using this information, the bandwidth managers compute both the bandwidth utilized and available on each segment of the ring. When a request for a new SLA is made, the bandwidth manager uses these computations and determines if the new SLA can be accommodated.

The bandwidth managers are, in one embodiment, computers operating software to perform the management functions described above. A pair of bandwidth managers are provided for reliability. Other embodiments of the invention, however, could have one or more bandwidth managers.

Network Reconfiguration

In some embodiments of the invention, an additional protocol is implemented, referred to herein as a "Fail-Safe Management Protocol" (FSMP). The FSMP protects the network 100 against failure of the links connecting the QoS Nodes as well as failure of the QoS Nodes themselves.

In one embodiment, a network 100 operates with FSMP by including a self-healing physical layer. When a failure occurs in part of the ring, the ring reconfigures itself to avoid the failure. FSMP then detects the reconfiguration and initializes a network status update. Such self-healing is well-known in the art such as in networks using SONET or FDDI protocols.

In another embodiment, ring 104 is a dual ring, where one ring transmits packets in a clockwise direction and a second ring transmits packets in a counter-clockwise direction. In case of failure, the network reconfigures itself from a dual ring into a single logical working ring. Other systems, such as SONET, have also used dual ring configurations. SONET however, uses its dual rings to simultaneously send two versions of the bit stream: one version clockwise and the other counter-clockwise. While this strategy ensures reliability, it is also very wasteful of valuable bandwidth.

Figure 13A:
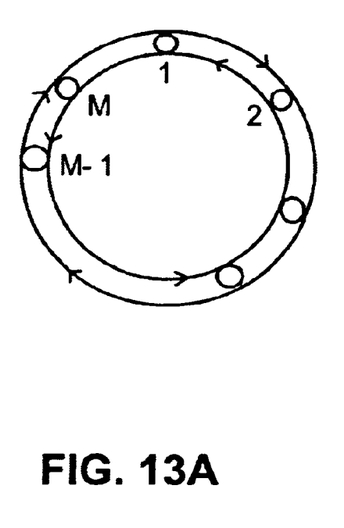
Figure 13B:
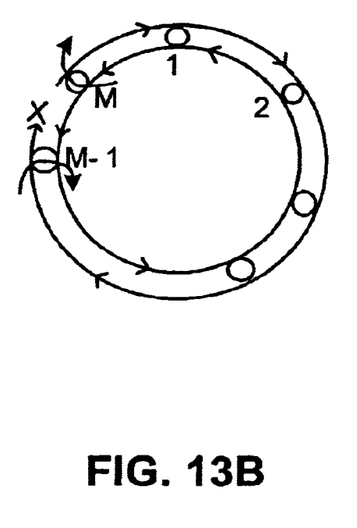

In contrast, an example of FSMP in accordance with the invention is explained with reference to FIGS. 13a and 13b, which illustrates ring nodes 1 . . . M. In FIG. 13a, each QoS Node on the ring monitors its incoming data streams from the dual links. The ring allows transmission in either direction (clockwise or counter-clockwise) in an embodiment of the invention for both robustness and to allow the shortest path to be chosen for communication between any two QoS Nodes, which helps enable the minimum rates of the SLAs to be met. Still, unlike SONET, only one version of the packet is sent. But if, for instance, the incoming stream to node M stops on the link from node M-1, as shown in FIG. 13b, then QoS Node M sends a message to QoS Node 1. QoS Node 1 confirms reception of the message to QoS Node M. QoS Node 1 then sends a message to QoS Node 2, which confirms receipt of the message, and the process continues. When QoS Node M-1 sends a message to QoS Node M, QoS Node M will not receive the message and, hence, QoS Node M-1 will not receive a confirming message.

When QoS Node M does not confirm the message, then failure of the links between QoS Node M-1 and QoS Node M is confirmed. The QoS Nodes then reconfigure the rings as shown in FIG. 13b, such that a single ring is formed using the dual links. The QoS Nodes also initiate a network status update that triggers an alarm for the network bandwidth manager to re-run its calculations to determine whether the reconfiguration has resulted in any bandwidth reservations being violated (i.e., the question is asked of whether the network can still support the rate requirements of all the SLAs).

Time Stamp

As is known in the art, certain protocols, such as the Transmission Control Protocol (TCP), penalize connections that face long delays: the connections with short delays are awarded most of the link bandwidth. To avoid such penalties, some embodiments of the invention attach a time stamp to a packet as it enters a QoS Node from a packet switch. Once the packet has arrived at the QoS Node immediately prior to the destination packet switch, the packet goes through a playback buffer to ensure that the packet leaves T seconds after it entered the first QoS Node. In embodiments implementing this scheme, the QoS Nodes keep their clocks synchronized by using a standard clock synchronization method that will be known to those of skill in the art. In this manner, all connections are designated a minimum delay, preventing speedy connections from usurping excessive bandwidth.

A system and method has now been described that allows efficient operations of a communications network that includes bandwidth guarantees. Some embodiments of the invention further provide delay guarantees as well as regulate data flow and provide network reliability. A system in accordance with the invention is not only high performance, but also economical, simple, and flexible, while remaining compatible with much of the hardware and software already in place, particularly hardware and software for routers and ethernet interfaces. In essence, the SLAs for a system and method in accordance with the invention can be equated to virtual leased lines. Further, because the network management system enables straightforward provisioning and monitoring of SLAs, an embodiment of the invention may be particularly useful in a metropolitan area network (MAN).

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A method of data packet transmission comprising:
receiving a data packet;
classifying the data packet based on classification information associated with the data packet;
storing the data packet in one of a plurality of queues, the one queue corresponding to the classification of the packet; and
scheduling transmission of the data packet from the one queue with transmission of other data packets stored in the other queues in accordance with a deficit golden ratio algorithm, including:
scheduling transmission of the data packet from the one queue with transmission of other data packets stored in the other queues according to a golden ratio; and
assigning to a data stream associated with the data packet a deficit if transmission of the data packet will equal or exceed a threshold bandwidth value corresponding to the associated data streams, and a credit if transmission of the data packet will not equal or exceed the threshold bandwidth value corresponding to the associated data stream.

2. The method of claim 1 wherein classifying the data packet based on classification information associated with the data packet comprises classifying the data packet based on information obtained from the data packet.

3. The method of claim 2 wherein classifying the data packet based on information obtained from the data packet comprises classifying the data packet based on information obtained from a header of the packet.

4. The method of claim 2 wherein classifying the data packet based on information obtained from the data packet comprises classifying the data packet based, at least in part, on source and destination address information.

5. The method of claim 4 wherein classifying the data packet based, at least in part, on source and destination address information comprises classifying the data packet based on physical layer address information.

6. The method of claim 1 wherein classifying the data packet based on classification information associated with the data packet comprises classifying the data packet based, at least in part, on information indicating packet type.

7. An article of manufacture comprising a machine accessible medium having content that when accessed provides instructions to cause an electronic device to:
receive a data packet;
classify the data packet based on classification information associated with the data packet;
store the data packet in one of a plurality of queues, the one queue corresponding to the classification of the packet; and schedule transmission of the data packet from the one queue with transmission of other data packets stored in the other queues in accordance with a deficit golden ratio algorithm, including the content providing instructions to cause the electronic device to:

schedule transmission of the data packet from the one queue with transmission of other data packets stored in the other queues according to a golden ratio; and assign to a data stream associated with the data packet a deficit if transmission of the data packet will equal or exceed a threshold bandwidth value corresponding to the associated data stream, and a credit if transmission of the data packet will not equal or exceed the threshold bandwidth value corresponding to the associated data stream.

8. The article of manufacture of claim 7 wherein the content providing instructions to cause the electronic device to classify the data packet based on classification information associated with the data packet comprises the content providing instruction to cause the electronic device to classify the data packet based on information obtained from the data packet.

9. The article of manufacture of claim 8 wherein the content providing instructions to cause the electronic device to classify the data packet based on information obtained from the data packet comprises the content providing instructions to cause the electronic device to classify the data packet based on information obtained from a header of the packet.

10. The article of manufacture of claim 8 wherein the content providing instructions to cause the electronic device to classify the data packet based on information obtained from the data packet comprises the content providing instructions to cause the electronic device to classify the data packet based, at least in part, on source and destination address information.

11. The article of manufacture of claim 10 wherein the content providing instructions to cause the electronic device to classify the data packet based, at least in part, on source and destination address information comprises the content providing instructions to cause the electronic device to classify the data packet based on physical layer address information.

12. The article of manufacture of claim 7 wherein the content providing instructions to cause the electronic device to classify the data packet based on classification information associated with the data packet comprises the content providing instruction to cause the electronic device to classify the data packet based, at least in part, on information indicating packet type.

13. A method for transmitting data packets received from multiple data streams, comprising:

assigning a bit weight to each data stream;

generating a set of numbers;

associating a number of the set to each data packet based, at least in part, on a minimum bandwidth specification associated with a data stream to which the data packet corresponds;

ordering the data packets based on the number associated with each data packet;

transmitting the data packets as ordered;

monitoring a number of bits transmitted associated with one or more of the data streams; and assigning a value to the data stream(s) monitored, the value being:

a credit of a quantity: the bit weight minus the number of bits transmitted, if the number of bits transmitted is less than the bit weight; and a deficit of a quantity: the number of bits transmitted minus the bit weight, if the number of bits transmitted is greater than or equal to the bit weight.

14. The method of claim 13 wherein generating a set of numbers comprises multiplying a golden ratio value by a set of integers to obtain a set of decimal fractions, and wherein associating a number of the set to each data packet comprises assigning each data packet a different decimal fraction.

15. The method of claim 14 wherein ordering the data packets comprises ordering the data packets in order of ascending value of the respective associated decimal fractions.

16. The method of claim 14 wherein ordering the data packets comprises ordering the data packets in order of descending value of the respective associated decimal fractions.

17. The method of claim 14 further comprising repeating transmitting the data packets, monitoring the number of bits transmitted, and assigning credits and deficits until the credit for each data stream is less than or equal to zero.

18. The method of claim 17 further comprising reducing the quantity of the credit by the quantity of the deficit.

19. An article of manufacture comprising a machine accessible medium having content that when accessed provides instructions to cause an electronic system to:

assign a bit weight to each data stream;

generate a set of numbers;

associate a number of the set to each data packet based, at least in part, on a minimum bandwidth specification associated with a data stream to which the data packet corresponds;

order the data packets based on the number associated with each data packet;

transmit the data packets as ordered;

monitor a number of bits transmitted associated with one or more of the data streams; and assign a value to the data stream(s) monitored, the value to be:

a credit of a quantity: the bit weight minus the number of bits transmitted, if the number of bits transmitted is less than the bit weight; and a deficit of a quantity: the number of bits transmitted minus the bit weighs, if the number of bits transmitted is greater than or equal to the bit weight.

20. The article of manufacture of claim 19 wherein the content to provide instructions to generate a set of numbers comprises the content to provide instructions to cause the electronic system to multiply a golden ratio value by a set of integers to obtain a set of decimal fractions, and wherein the content to provide instructions to associating a number of the set to each data packet comprises the content to provide instructions to cause the electronic system to assign each data packet a different decimal fraction.

21. The article of manufacture of claim 20 wherein the content to provide instructions to order the data packets comprises the content to provide instructions to cause the electronic system to order the data packets in order of ascending value of the respective associated decimal fractions.

22. The article of manufacture of claim 20 wherein the content to provide instructions to order the data packets comprises the content to provide instructions to cause the electronic system to order the data packets in order of descending value of the respective associated decimal fractions.

23. The article of manufacture of claim 20 further comprising the content to provide instructions to cause the electronic system to transmit the data packets, monitor the number of bits transmitted, and assign credits and deficits until the credit for each data stream is less than or equal to zero.

24. The article of manufacture of claim 23 further comprising the content to provide instructions to cause the electronic system to reduce the quantity of the credit by the quantity of the deficit.

* * * * *